(12) United States Patent
Gohara et al.

(10) Patent No.: US 9,490,731 B2
(45) Date of Patent: Nov. 8, 2016

(54) FAN MOTOR DRIVING APPARATUS AND METHOD, COOLING SYSTEM INCLUDING THE SAME, AND ELECTRONIC EQUIPMENT

(71) Applicant: ROHM CO., LTD., Ukyo-ku, Kyoto (JP)

(72) Inventors: Yuki Gohara, Kyoto (JP); Tomofumi Mishima, Kyoto (JP)

(73) Assignee: ROHM CO., LTD., Kyoto (JP)

( * ) Notice: Subject to any disclaimer, the term of this patent is extended or adjusted under 35 U.S.C. 154(b) by 0 days.

(21) Appl. No.: 14/887,850

(22) Filed: Oct. 20, 2015

(65) Prior Publication Data
US 2016/0118916 A1  Apr. 28, 2016

(30) Foreign Application Priority Data
Oct. 22, 2014 (JP) .................................. 2014-215641

(51) Int. Cl.
| | |
|---|---|
| H03K 5/00 | (2006.01) |
| H02P 1/04 | (2006.01) |
| H02P 25/00 | (2006.01) |
| H02P 6/12 | (2006.01) |
| H02P 6/00 | (2016.01) |
| H02P 6/16 | (2016.01) |
| H02P 6/08 | (2016.01) |

(52) U.S. Cl.
CPC ................. *H02P 6/12* (2013.01); *H02P 6/001* (2013.01); *H02P 6/008* (2013.01); *H02P 6/085* (2013.01); *H02P 6/165* (2013.01)

(58) Field of Classification Search
CPC ....... H02K 11/33; H02P 27/06; H02P 6/182; H02P 27/08; H02P 6/00; H02P 6/12; H02P 6/16; H02P 6/08

USPC .............................. 318/400.09, 400.13, 774
See application file for complete search history.

(56) References Cited

U.S. PATENT DOCUMENTS

| | | | | |
|---|---|---|---|---|
| 5,796,194 | A * | 8/1998 | Archer | H02K 29/12 310/184 |
| 6,147,465 | A * | 11/2000 | Hollenbeck | H02P 6/26 318/400.08 |
| 2008/0315808 | A1* | 12/2008 | Mishima | H02P 29/032 318/400.21 |
| 2010/0225263 | A1* | 9/2010 | Mishima | H02P 7/29 318/430 |
| 2010/0308760 | A1* | 12/2010 | Nakamura | H02P 6/15 318/400.11 |
| 2016/0013742 | A1* | 1/2016 | Gohara | H02H 7/085 318/461 |

FOREIGN PATENT DOCUMENTS

JP    2007159296 A    6/2007

* cited by examiner

*Primary Examiner* — Eduardo Colon Santana
*Assistant Examiner* — Gabriel Agared
(74) *Attorney, Agent, or Firm* — Cantor Colburn LLP (57) ABSTRACT

A motor driving apparatus comprises an H bridge circuit having outputs coupled with a motor coil of a single-phase motor, a hall comparator configured to generate a hall detection signal indicating a position of a rotor of the motor, an electric angle generator configured to generate a pulse signal indicating that the motor rotates by a predetermined electric angle, a current monitoring circuit configured to asserts a zero current detection signal upon detecting a reversed direction of a coil current; a transition trigger circuit configured to assert a transition pulse when a count value of the first counter matches an lead angle set value; a logic circuit configured to transition the H bridge circuit according to a predetermined sequence of states; and a lead angle controller configured to adjust the lead angle set value based on a timing of assertion of the zero current detection signal.

18 Claims, 11 Drawing Sheets

FAN MOTOR DRIVING APPARATUS AND METHOD, COOLING SYSTEM INCLUDING THE SAME, AND ELECTRONIC EQUIPMENT

CROSS-REFERENCE TO RELATED APPLICATION

The present invention claims priority under 35 U.S.C. §119 to Japanese Application No. 2014-215641, filed on Oct. 22, 2014, the entire content of which is incorporated herein by reference.

TECHNICAL FIELD

The present disclosure relates to a technique for driving a fan motor.

BACKGROUND

In recent years, with an increase in speed of personal computers and workstations, the operation speed of a computing LSI (Large Scale Integrated circuit) such as a CPU (Central Processing Unit), a DSP (Digital Signal Processor) and the like steadily has been increased. Such LSI generates more heat at a higher operation speed, i.e., a higher clock frequency. The heat from the LSI may lead the LSI itself to a thermal runaway or may affect peripheral circuits. Therefore, it is very important to appropriately cool a heat generating element including the LSI. An example of a technique for cooling the LSI may include an air cooling method using a cooling fan. In this method, for example, the cooling fan is installed to face the surface of the LSI and blows cold air onto the surface of the LSI.

Figure 1:
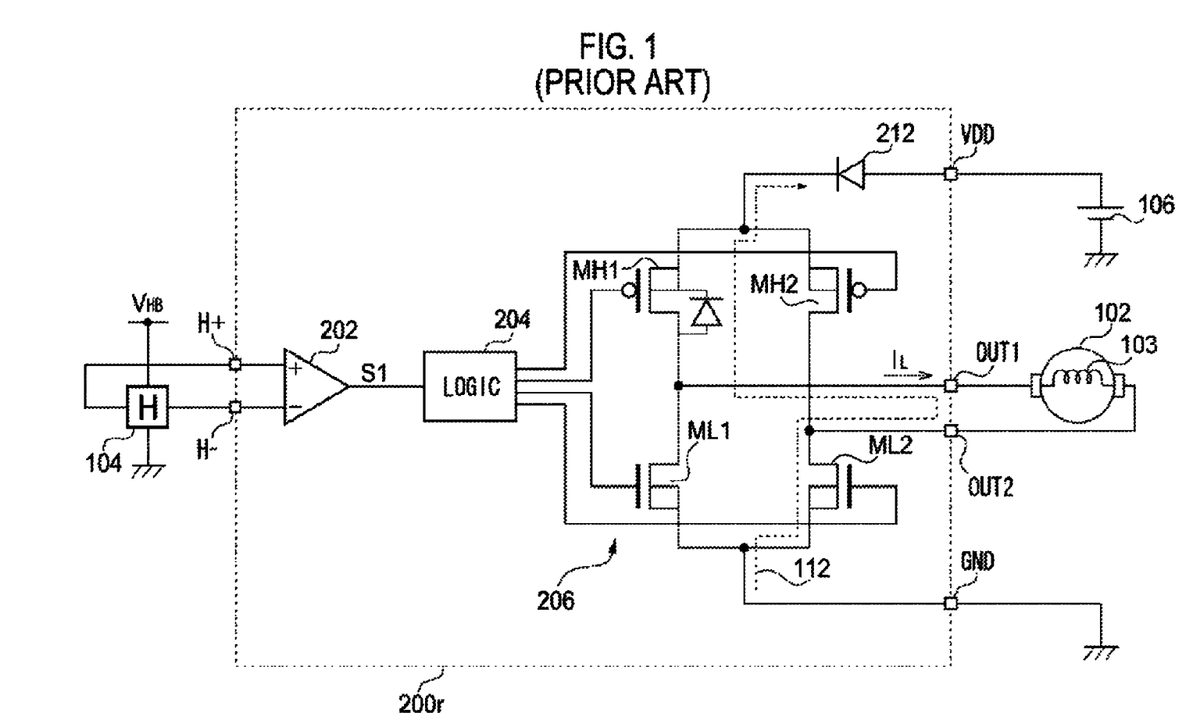
FIG. 1 is a circuit diagram of a motor driving apparatus.

FIG. 1 is a circuit diagram of a motor driving apparatus 200r. The motor driving apparatus 200r drives a single-phase DC motor 102 (also simply referred as a motor or a single-phase motor). A hall element 104 is provided in the vicinity of the single-phase motor 102. The hall element 104 generates a pair of hall signals $V_{H+}$ and $V_{H-}$ having the opposite phases which indicate the position of a rotor of the motor 102. A hall comparator 202 compares the hall signals $V_{H+}$ and $V_{H-}$ and generates a hall detection signal S1 indicating the position of the rotor. A logic circuit 204 transitions an H bridge circuit 206 among a plurality of states in synchronization with the hall detection signal S1, i.e., in synchronization with the rotation of the rotor of the single-phase motor 102.

The H bridge circuit 206 is connected to a motor coil 103 to be driven. When an external power supply 106 having the opposite polarity is connected to the H bridge circuit 206, a large current flows. In order to prevent such large current flow, a protection diode 212 for preventing a reverse connection is interposed between the H bridge circuit 206 and a power supply terminal VDD.

Figure 2A:
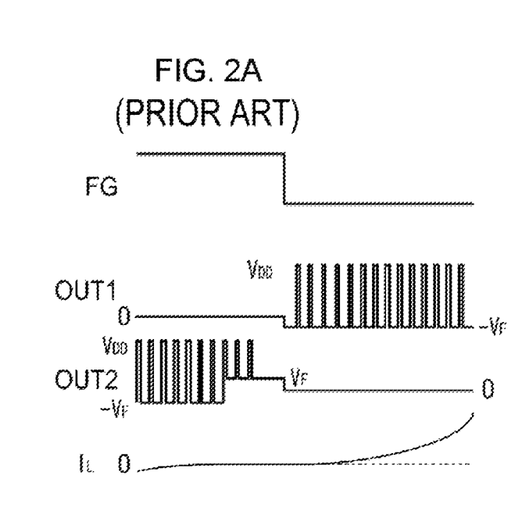
FIGS. 2A and 2B are operation waveform diagrams of the motor driving apparatus of FIG. 1.
Figure 2B:
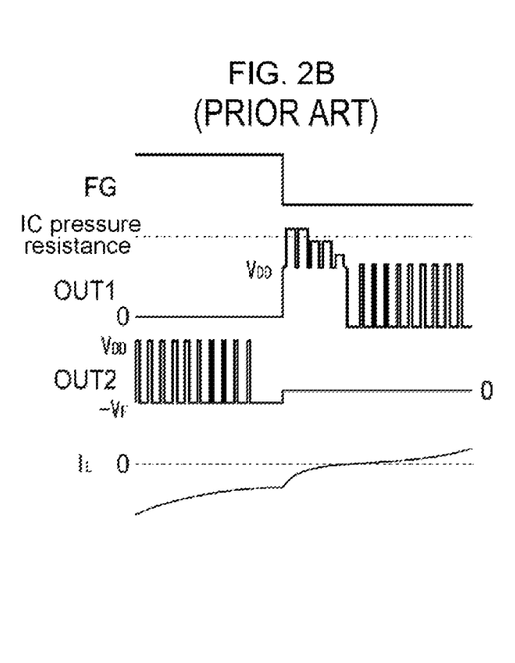

FIGS. 2A and 2B are operation waveform diagrams of the motor driving apparatus 200r illustrated in FIG. 1. FIG. 2A shows a case where the phase of a coil current $I_L$ leads and FIG. 2B shows a case where the phase of the coil current $I_L$ lags.

The motor driving apparatus 200r of FIG. 1 controls its outputs OUT1 and OUT2 according to the hall detection signal S1 irrespective of the phase of the coil current $I_L$. Under this control, if the phase of the coil current $I_L$ lags, the coil current $I_L$ flows into the motor coil 103 from OUT2 to OUT1 in an interval during which a low-side transistor ML2 is turned on and other transistors MH1, MH2 and ML1 are turned off. At this time, the coil current $I_L$ flows into the external power supply 106 via a path 112 including the low-side transistor MH2, the motor coil 103 and a body diode of the high-side transistor MH1. As a result, as shown in FIG. 2B, there is a danger that a voltage of the output OUT2 or a power supply voltage jumps. If this jumping voltage exceeds the breakdown voltage of an IC, it has an adverse effect on reliability of the IC.

It has been conventionally common to dispose a Zener diode and a smoothing capacitor in parallel to the H bridge circuit 206 in order to suppress the jumping voltage.

In addition, the efficiency and torque characteristics of the motor are dependent on a current phase and an excessive lag of the current phase degrades the efficiency and torque characteristics.

SUMMARY

The present disclosure provides some embodiments of a motor driving apparatus which is capable of preventing jump of a power supply voltage and an output voltage according to an approach different from conventional techniques and/or improving efficiency and torque characteristics.

According to one embodiment of the present disclosure, there is provided a motor driving apparatus for driving a single-phase motor, including: an H bridge circuit which receives a power supply voltage and a ground voltage, with a motor coil of the single-phase motor connected between a first output and a second output; a hall comparator which compares a pair of hall signals generated by a hall element and generates a hall detection signal indicating a position of a rotor of the single-phase motor; a speed detection circuit which receives the hall detection signal and generates a speed detection signal having a period depending on the rotational speed of the single-phase motor; an electric angle generator which generates a pulse signal having an integer fraction of the period of the speed detection signal and indicating rotation of the single-phase motor by a predetermined electric angle; a current monitoring circuit which asserts a zero current detection signal when an inversion of direction of a coil current flowing into the motor coil is detected; a transition trigger circuit which includes a first counter reset for each edge of the hall detection signal and counting the pulse signal with clocks and asserts a transition pulse when a count value of the first counter matches an lead angle set value; a logic circuit which transitions the H bridge circuit among a plurality of states according to a predetermined sequence, at least with the transition pulse as a trigger; and an lead angle controller which adjusts the lead angle set value based on a timing of assertion of the zero current detection signal.

With this configuration, it is possible to approach the current phase to a desired position by detecting an inversion timing (zero current) of a coil current by means of the current monitoring circuit and then, based on the detected timing, detecting a phase lead or lag of the coil current and adjusting the lead angle set value by means of the lead angle controller. Thus, it is possible to prevent a voltage jump due to a current phase lag and/or improve torque characteristics and efficiency.

The lead angle controller may include: a second counter which is reset in response to the assertion of the transition pulse and counts the pulse signal with clocks; a correction amount setting circuit which outputs a correction amount based on a count value of the second counter when the zero current detection signal is asserted; and an arithmetic circuit which outputs the lead angle set value based on the correction amount. With this configuration, it is possible to detect the amount of phase lead and lag based on the timing of the zero current and to determine an appropriate correction amount based on the detected amount of phase lead and lag.

The arithmetic circuit may generate the lead angle set value based on an integrated value of the correction amount. Thus, it is possible to follow the current phase to a target position.

The arithmetic circuit may include: a memory which stores the integrated value of the correction amount; and a first adder which adds a value of the memory and the correction amount and stores a result of the addition in the memory.

The arithmetic circuit may include a second counter which generates the lead angle set value by adding a predetermined lead angle reference value to the integrated value of the correction amount. In this case, a target value of the current phase can be set at random based on the lead angle reference value.

The motor driving apparatus may further include: a setting terminal which receives an analog lead angle reference voltage; and an A/D converter which converts the analog lead angle reference voltage into a digital lead angle reference value. In this case, the optimal current phase can be set by changing a voltage applied to the setting terminal depending on a platform on which the motor driving apparatus is mounted and a single-phase motor to be driven.

For example, a resistance voltage dividing circuit dividing the power supply voltage and the reference voltage may be externally attached to the setting terminal. Thus, the current phase can be set based on the resistance.

The correction amount may be set with a dead zone in the vicinity of zero of the amount of phase lead lag indicated by a count value of the second counter. Thus, it is possible to prevent the current phase from being fluctuated in the vicinity of a target value.

The logic circuit repeats a sequence may include: at least, a conduction state in which one of the first output and the second output is assumed as an ON output, the other is assumed as an OFF output, the ON output is fixed to the power supply voltage or switched between the power supply voltage and high impedance at a predetermined duty cycle, and the OFF output is assumed as the ground voltage; a pre-regenerative state in which the ON output and the OFF output are exchanged, the ON output is assumed as the ground voltage, and the OFF output is assumed as the high impedance; and a post-regenerative state in which the ON output is assumed as the ground voltage or the high impedance and the OFF output is assumed as the ground voltage.

The current monitoring circuit may assert the zero current detection signal when a voltage of the OFF output exceeds a first threshold voltage set to or near the ground voltage in the pre-regenerative state. With this configuration, it is possible to detect that the zero current is generated in the pre-regenerative state based on a counter electromotive force.

The current monitoring circuit may assert the zero current detection signal when a voltage of the ON output is lower than a second threshold voltage set between the power supply voltage and the ground voltage in the post-regenerative state. With this configuration, it is possible to detect that the zero current is generated in the post-regenerative state based on a counter electromotive force.

The current monitoring circuit may include: a selector which selects the first threshold voltage in the pre-regenerative state and the second threshold voltage in the post-regenerative state; a first comparator which compares the voltage of the first output with an output of the selector; and a second comparator which compares the voltage of the second output with the output of the selector.

The sequence may further include: a soft switching down state inserted between the conduction state and the pre-regenerative state, in which the ON output is switched between the power supply voltage and the high impedance at a gradually decreasing duty cycle and the OFF output is assumed as the ground voltage; and a soft switching up state inserted between the post-regenerative state and the next conduction state, in which the ON output is switched between the power supply voltage and the high impedance at a gradually increasing duty cycle and the OFF output is assumed as the ground voltage. With this configuration, it is possible to reduce a noise during commutation.

The motor driving apparatus may be integrated on a signal semiconductor substrate. As used herein, the term "integrated" is intended to include both of a case where all elements of a circuit are formed on a semiconductor substrate and a case where main elements of the circuit are integrated on the semiconductor substrate. In addition, some resistors, capacitors and the like for adjustment of a circuit constant may be provided outside the semiconductor substrate. By integrating the circuit into a single chip, it is possible to reduce a circuit area and keep characteristics of circuit elements constant.

According to another embodiment of the present disclosure, there is provided a cooling system including: a fan motor; a hall element which generates a pair of hall signals indicating the position of a rotor of the fan motor; and the above-described motor driving apparatus which drives the fan motor based on the pair of hall signals.

According to another embodiment of the present disclosure, there is provided an electronic equipment including: a processor; a fan motor installed to face the processor; a hall element which generates a pair of hall signals indicating the position of a rotor of the fan motor; and the above-described motor driving apparatus which drives the fan motor based on the pair of hall signals.

Any combinations of the above-described elements or changes of the representations of the present disclosure between methods, apparatuses and systems are effective as embodiments of the present disclosure.

DETAILED DESCRIPTION

Preferred embodiments of the present invention will now be described in detail with reference to the drawings. Throughout the drawings, the same or similar elements, members and processes are denoted by the same reference numerals and explanation of which will not be repeated. The disclosed embodiments are provided for the purpose of illustration, not limitation, of the present disclosure and all features and combinations thereof described in the embodiments cannot be necessarily construed to describe the spirit of the present disclosure.

In the specification, the phrase "connection of a member A and a member B" is intended to include a direct physical connection of the member A and the member B as well as an indirect connection thereof via other member as long as the other member has no substantial effect on the electrical connection of the member A and the member B.

Similarly, the phrase "interposition of a member C between a member A and a member B" is intended to include a direct connection of the member A and the member C or a direct connection of the member B and the member C as well as an indirect connection thereof via other member as long as the other member has no substantial effect on the electrical connection of the member A, the member B and the member C.

An embodiment of the present disclosure will be illustrated with a fan motor driving apparatus (also simply referred to as a driving apparatus) for driving a fan motor which is mounted on an electronic computer such as a personal computer, a workstation or the like.

Figure 3:
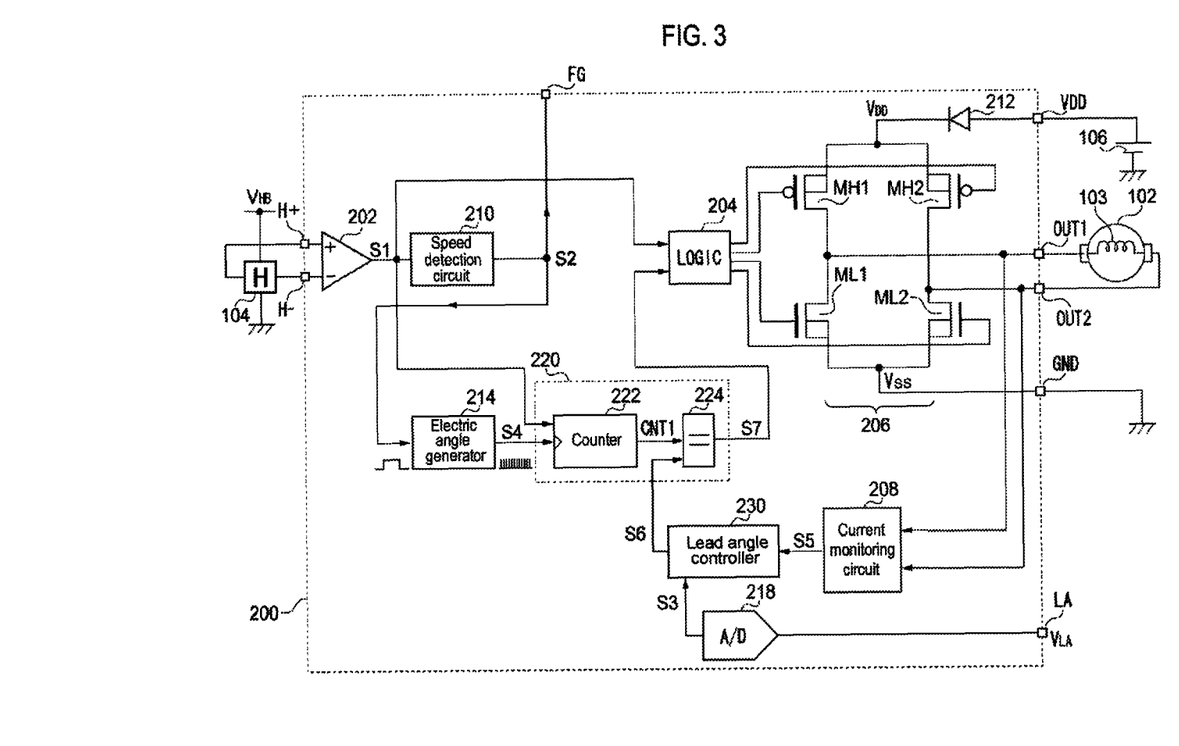
FIG. 3 is a circuit diagram illustrating a configuration of a motor driving apparatus according to an embodiment.

FIG. 3 is a circuit diagram illustrating a configuration of a motor driving apparatus 200 according to an embodiment. The motor driving apparatus 200 is configured to drive a single-phase DC motor 102 (also simply referred as a motor or a single-phase motor). A hall element 104 is provided in the vicinity of the single-phase motor 102. The hall element 104 generates a pair of hall signals $V_{H+}$ and $V_{H-}$ having the opposite phases which indicate the position of a rotor of the motor 102. A hall bias voltage $V_{HB}$ is supplied to a bias terminal of the hall element 104. The hall bias voltage $V_{HB}$ may be generated by a reference voltage source (a hall bias circuit) contained in the motor driving apparatus 200 or may be generated by dividing a voltage $V_{DD}$ generated by an external power supply 106. The hall element 104 may be contained in the motor driving apparatus 200.

The motor driving apparatus 200 includes a hall comparator 202, a logic circuit 204, an H bridge circuit 206, a current monitoring circuit 208, a speed detection circuit 210, a protection diode 212, an electric angle generator 214, a transition trigger circuit 220, an lead angle controller 230 and an A/D converter 218, all of which may be integrated on a single semiconductor substrate. As used herein, the term "integrated" is intended to include both of a case where all elements of a circuit are formed on a semiconductor substrate and a case where main elements of the circuit are integrated on the semiconductor substrate. In addition, some resistors, capacitors and the like for adjusting a circuit constant may be provided outside the semiconductor substrate.

The power supply voltage $V_{DD}$ is supplied from the external power supply 106 to a power supply (VDD) terminal of the motor driving apparatus 200. A coil (motor coil) 103 of the single-phase motor 102 is connected between output terminals OUT1 and OUT2 of the motor driving apparatus 200. A ground (GND) terminal is grounded. The hall signals $V_{H+}$ and $V_{H-}$ generated by the hall element 104 are input to hall terminals H+ and H−, respectively, of the hall comparator 202. A lead angle reference voltage $V_{LA}$, which is an analog voltage indicating a target position of a current phase, is input to a lead angle setting terminal (LA). The A/D converter 218 converts the lead angle reference voltage $V_{LA}$ into a lead angle reference value S3 which is digital data. In some embodiments, the digital lead angle reference value S3 may be directly supplied from the outside to the motor driving apparatus 200 or may be stored in an internal memory of the motor driving apparatus 200. In these embodiments, the A/D converter 218 may be omitted.

The hall comparator 202 compares the hall signals $V_{H+}$ and $V_{H-}$ and generates a hall detection signal S1 indicating the position of the rotor of the single-phase motor 102. The hall detection signal S1 may be transitioned whenever the hall signals $V_{H+}$ and $V_{H-}$ are crossed (zero-crossed).

The H bridge circuit 206 receives the power supply voltage $V_{DD}$ and a ground voltage $V_{SS}$. A motor coil 103 of the single-phase motor 102 is connected between a first output OUT1 and a second output OUT2 of the H bridge circuit 206. The H bridge circuit 206 may include a first high-side transistor MH1, a second high-side transistor MH2, a first low-side transistor ML1 and a second low-side transistor ML2. The protection diode 212 configured to prevent a reverse connection is interposed between the H bridge circuit 206 and the external power supply 106.

The H bridge circuit 206 may have a plurality of states, that is, different combinations of ON/OFF states of the four transistors. A functional block (state controller) contained in the logic circuit 204 may transition the H bridge circuit 206 according to a predetermined sequence including some or all of the plurality of states.

The speed detection circuit 210 may receive the hall detection signal S1 and generate a speed detection signal S2 having a period $T_{FG}$ corresponding to the rotational speed of the single-phase motor 102. The speed detection signal S2 is also called "FG (Frequency Generation) signal" and is output from a terminal (FG) of the motor driving apparatus 200 to the outside.

The electric angle generator 214 generates a pulse signal S4 having a period $T_P$ which is a unit fraction of an integer part (1/N times) of the period $T_{FG}$ of the speed detection signal S2. One period $T_P$ of the pulse signal S4 indicates that the single-phase motor 102 is rotated by a predetermined electric angle. For example, the electric angle generator 214 may contain a counter for measuring the period $T_{FG}$ of the speed detection signal S2 using a clock signal. The electric angle generator 214 may multiply a count value measured in the past cycle by 1/N to generate a value $K_P$, which corresponds to the period $T_P$ of the pulse signal S4, and may output the pulse signal S4 when the counter counts up (or counts down) the clock signal by the value $K_P$. For example, for a 4-pole motor and N=256, the period of the pulse signal S4 may be calculated to 0.7° (electric angle) (=720/4×1/256).

Upon detecting a reversal of the direction of the coil current $I_L$ flowing through the motor coil 103 (in other words, upon detecting a zero current), the current monitoring circuit 208 asserts (for example, a high level) a zero current detection signal S5. For example, the current monitoring circuit 208 may detect the zero current based on a voltage of each of the outputs OUT1 and OUT2, more specifically, a counter electromotive force generated when the outputs OUT1 and OUT2 have high impedance.

The transition trigger circuit 220 includes a first counter 222 which may be reset at each edge of the hall detection signal S1 and count using the pulse signal S4 as a clock. When a count value CNT1 of the first counter 222 matches a lead angle set value S6, the transition trigger circuit 220 asserts a transition pulse S7. In some embodiments, the transition trigger circuit 220 may include a digital comparator 224 to compare the counter value CNT1 and the lead angle set value S6. In some embodiments, the first counter 222 may be further configured to conduct the comparison.

The logic circuit 204 may be configured to transition a state of the H bridge circuit 206 according to a predetermined sequence of some or all of the plurality of states, using at least the transition pulse S7 as a trigger. As to the phrase "using at least the transition pulse S7 as a trigger" used herein, the assertion of the transition pulse S7 may be the condition for the state transition. For example, (i) a state of the H bridge circuit 206 may be changed in response to the assertion of the transition pulse S7, (ii) the state may be changed after a predetermined time from the time of starting the measurement of a response time to the assertion of the transition pulse S7, or (iii) the state may be changed by a logical product of the assertion of the transition pulse S7 and other conditions.

The lead angle controller 230 receives the zero current detection signal S5 from the current monitoring circuit 208 and adjusts the lead angle set value S6 when the zero current detection signal S5 is asserted. The lead angle set value S6 may be a value corrected based on the lead angle reference value S3.

The basic configuration of the motor driving apparatus 200 has been described above. The present disclosure includes various detailed circuits as illustrated as the circuit diagram, i.e., block diagram in FIG. 3, and details and examples of which will be described below.

Figure 4:
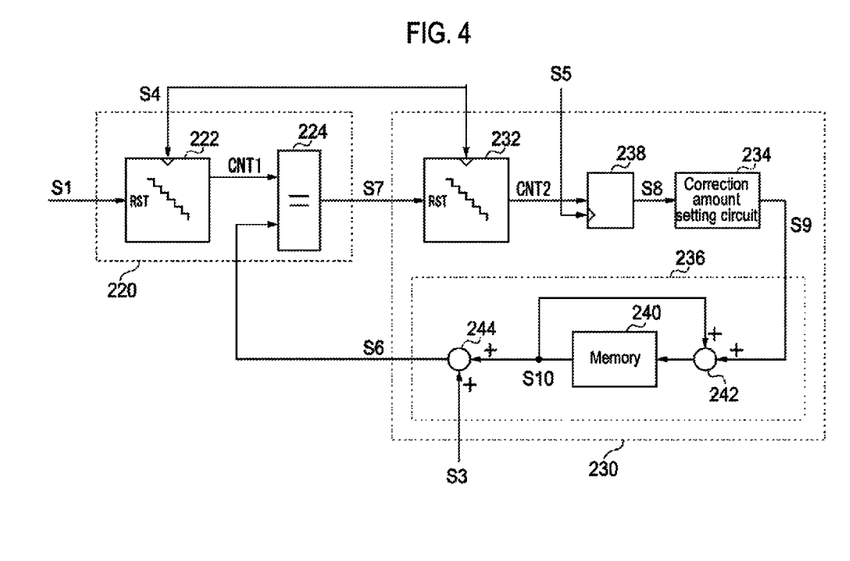
FIG. 4 is a circuit diagram illustrating an exemplary configuration of a lead angle controller.

FIG. 4 is a circuit diagram illustrating an exemplary configuration of the lead angle controller 230. The lead angle controller 230 may include a second counter 232, a correction amount setting circuit 234 and an arithmetic circuit 236. The lead angle controller 230 of FIG. 4 may be configured to measure a timing of the zero current detection signal S5 based on the assertion of the zero current detection signal S5.

The second counter 232 may perform a count operation using the pulse signal S4 as a clock. The second counter 232 may be reset in response to the assertion of the transition pulse S7. In the present embodiment, the second counter 232 may be a down counter and recounts from an initial value when a count value reaches zero.

Then memory 238 may stores a count value CNT2 of the second counter 232 when the zero current detection signal S5 is asserted. A value S8 (referred to as a current phase value) S8 stored in the memory 238 indicates a timing (phase lag and phase lead) at which a zero current is generated on the basis of the assertion of the transition pulse S7. The memory 238 may be a flip-flop, a latch or a register. The correction amount setting circuit 234 may output a correction amount S9 according to the current phase value S8 stored in the memory 238.

Figure 5:
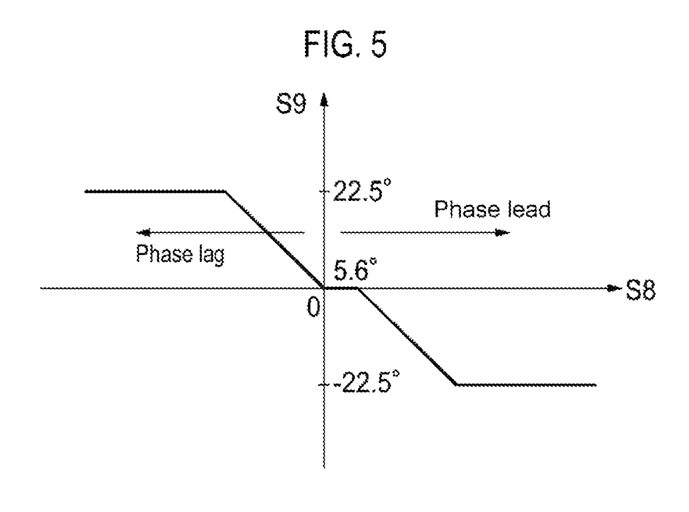
FIG. 5 is a graph showing a relationship between a current phase value and a correction amount which are defined in a correction amount setting circuit.

FIG. 5 is a graph showing a relationship between the current phase value S8 and the correction amount S9 which are defined in the correction amount setting circuit 234. When the first counter 222 is configured by a down counter, the smaller the lead angle setting value S6 is, the later the timing of the assertion of the transition pulse S7 will be. Conversely, the larger the lead angle setting value S6 is, the earlier the timing of the assertion of the transition pulse S7 will be. Therefore, the lead angle controller 230 may be configured to decrease the lead angle set value S6 by adding a negative correction amount S9 thereto when the current phase indicated by the current phase value S8 is led. Conversely, the lead angle controller 230 may be configured to increase the lead angle set value S6 by adding a positive correction amount S9 thereto when the current phase indicated by the current phase value S8 is lagged. When the first counter 222 is configured by an up counter, since the above magnitude relationships of the lead angle setting value S6 is reversed, the positive/negative of correction amount S9 is reversed.

For example, when the first counter 222 is an 8-bit down counter, the count value CNT1 decreases from 255 to 0. Unless the first counter 222 is reset during the decreasing operation, the count value CNT1 returns to 255 and then decreases toward 0. Thus, it is noted that 255 and 0 are continuous and the calculation (addition and subtraction) beyond the range from 0 to 255 m is permitted.

In addition, when the second counter 232 is configured by a down counter, since a latch timing of the count value CNT2 becomes faster as the phase of the coil current $I_L$ leads, the current phase value S8 increases. Conversely, as the phase of the coil current $I_L$ lags, the current phase value S8 decreases. When the second counter 232 is an up counter, the above magnitude relationship is reversed.

Therefore, when the current phase value S8 indicates the phase lead, the correction amount S9 is negative and the absolute value of the negative correction amount S9 is increased as the amount of phase lead is larger, so that the transition sequence of the H bridge circuit 206 is backwardly shifted in time. Conversely, when the current phase value S8 indicates the phase lag, the correction amount S9 is positive and the absolute value of the positive correction amount S9 is increased as the amount of phase lag is larger, so that the transition sequence of the H bridge circuit 206 is forwardly shifted in time.

The correction amount S9 may have an upper limit (for example, 22.5°) and a lower limit (−22.5°). A dead zone in which the correction amount S9 is zero may be set in the vicinity of zero of the phase lead (or lag) that the current phase value S8 indicates. This can prevent the current phase from swinging at the vicinity of zero, thereby stabilizing the system.

In some embodiments, the dead zone may be set to fall within a predetermined range (0 to 5.6°) where the current phase value S8 indicates the phase lead. This can maintain the current phase at the phase lead while the control loop is stabilized.

In some embodiments, the correction amount setting circuit 234 may contain a table which has the correspondence relationship between the current phase value S8 and the correction amount S9. In some embodiments, the table may have a calculation formula defining the correspondence relationship above so that the correction amount S9 may be calculated using the calculation formula.

Returning to FIG. 4, the arithmetic circuit 236 outputs the lead angle set value S6 according to the correction amount S9 generated by the correction amount setting circuit 234. For example, the arithmetic circuit 236 may generate the lead angle set value S6 according to integrated (or accumulated) values of the correction amount S9. For this purpose, the arithmetic circuit 236 may include a first adder 242 and a memory 240. The memory 240 may store an integrated value S10 of the correction amount S9. The first adder 242 may update the integrated value S10 in the memory 240 by adding the correction amount S9 to the value stored in the memory 240.

The arithmetic circuit 236 may further include a second adder 244. The second adder 244 may generate the lead angle set value S6 by adding the lead angle reference value S3 to the integrated value S10 of the correction amount S9. Since the lead angle set value S6 does not exceed a count range of the first counter 222, the lead angle set value S6 is restricted to zero or more in the present embodiment.

Subsequently, the transition sequence of the H bridge circuit 206 will be described. In the present embodiment, the logic circuit 204 transitions the H bridge circuit 206 based on at least the transition pulse S7 to sequence which will be described below. FIGS. 6A to 6F illustrate sequences of transitions of the H bridge circuit 206.

Figure 6A:
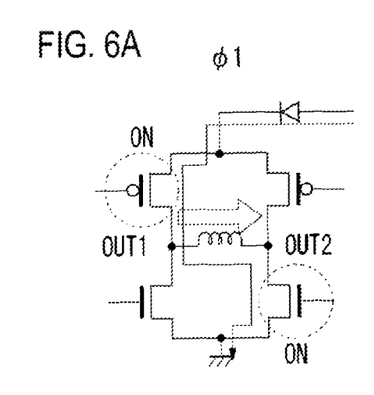
FIGS. 6A to 6F illustrate a sequence of transitions of an H bridge circuit.
Figure 6B:
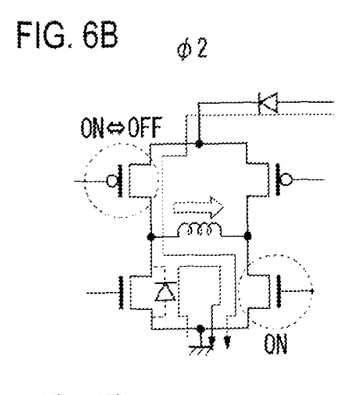

The logic circuit 204 may be configured to perform a commutation control to switch between an ON output and an OFF output alternately between the output OUT1 and the output OUT2 depending on the position of the rotor of the single-phase motor 102. In FIGS. 6A and 6B, OUT1 is an ON output and OUT2 is an OFF output. In FIGS. 6C to 6F, OUT2 is an ON output and OUT1 is an OFF output.

φ1: Conduction state

Referring to FIG. 6A, one of a first output OUT 1 and a second output OUT2, e.g., the output OUT1, is ON and may be the power supply voltage $V_{DD}$ while the other one, e.g., the output OUT2, is OFF and may be the ground voltage $V_{SS}$.

MH1=ON, ML1=OFF, MH2=OFF, ML2=ON
OUT1=$V_{DD}$, OUT2=$V_{SS}$

When the torque (rotational speed) of the single-phase motor 102 is controlled by a PWM (Pulse Width Modulation) operation, in the conduction state φ1, the ON output OUT1 may be switched between the power supply voltage $V_{DD}$ and high impedance HiZ at a predetermined duty cycle serving as a command value of the torque. The high impedance HiZ refers to a state where the high-side transistors MH and the low-side transistors ML are both turned off.

φ2: Soft Switching Down State

Referring to FIG. 6B, in the state φ2, the ON output OUT1 is switched between the power supply voltage $V_{DD}$ and the high impedance HiZ at a gradually decreasing duty cycle and the OFF output OUT2 is the ground voltage $V_{SS}$.

MH1=ON/OFF switching, ML1=OFF, MH2=OFF, ML2=ON

An initial value of the gradually decreasing duty cycle is a duty cycle in the conduction state and a final value thereof may be zero. The soft switching state φ2 may be inserted between the conduction state φ1 and a pre-regenerative state φ3 for the sake of a noise reduction of the motor. However, this state φ2 may be omitted in BTL (Bridged Transformer-Less) in which the power supply voltage $V_{DD}$ is gradually changed.

Figure 6C:
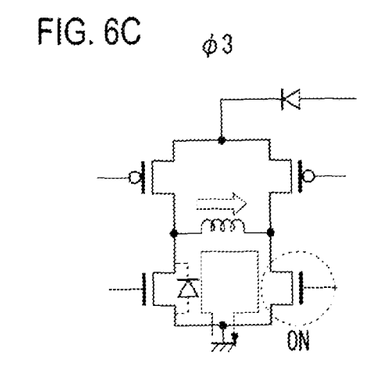

When the soft switching down state φ2 is completed, the ON output and the OFF output are exchanged and the following sequence is performed.

φ3: Pre-Regenerative State

Referring to FIG. 6C, the ON output OUT2 is the ground voltage $V_{SS}$ and the OFF output OUT1 is high impedance.
MH1=OFF, ML1=OFF, MH2=OFF, ML2=ON
OUT1=HiZ (high impedance state), OUT2=$V_{SS}$ φ4: Post-Regenerative State Referring to FIG. 6D, the ON output OUT2 is high impedance (or the ground voltage $V_{SS}$) and the OFF output OUT1 is the ground voltage $V_{SS}$.

Figure 6D:
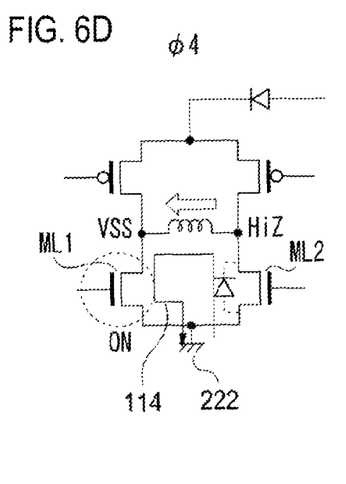
Figure 6E:
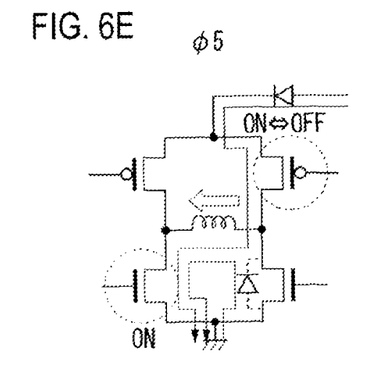

MH1=OFF, ML1=ON, MH2=OFF, ML2=OFF
OUT1=$V_{SS}$, OUT2=HiZ

φ5: Soft Switching Up State

Referring to FIG. 6E, in the state φ5, the ON output OUT2 is switched between the power supply voltage $V_{DD}$ and the high impedance HiZ at a gradually increasing duty cycle and the OFF output OUT1 is assumed as the ground voltage $V_{SS}$.

Figure 6F:
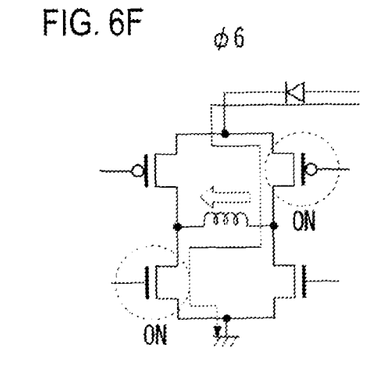

MH1=OFF, ML1=ON, MH2=ON/OFF switching, ML2=OFF

φ6: Conduction State

Referring to FIG. 6F, the ON output and the OFF output are simply exchanged, differently from FIG. 6A, and the states of the transistors of the H bridge circuit 206 are unchanged.

MH1=OFF, ML1=ON, MH2=ON, ML2=OFF
OUT1=$V_{SS}$, OUT2=$V_{DD}$

Subsequently, the current monitoring circuit 208 will be described. In case of the current phase lead, a zero current is generated in the pre-regenerative state φ3. When a voltage of an OFF output (OUT1 in FIG. 6C) exceeds a first threshold voltage $V_{TH1}$ in the pre-regenerative state φ3, the current monitoring circuit 208 asserts the zero current detection signal S5. The first threshold voltage $V_{TFD}$ is set to or near the ground voltage $V_{SS}$.

In case of the current phase lag, a zero current is generated in the post-regenerative state φ4. If a voltage of an ON output (OUT2 in FIG. 6D) is lower than a second threshold voltage $V_{TH2}$ in the post-regenerative state φ4, the current monitoring circuit 208 asserts the zero current detection signal S5. The second threshold voltage $V_{TH2}$ is set between the power supply voltage $V_{DD}$ and the ground voltage $V_{SS}$. It may be preferable to set $V_{TH1}$ to $V_{SS}$ and $V_{TH2}$ to $V_{DD}/2$ for the sake of easy generation, but may set them to any other voltage levels using a high-performance voltage source.

Figure 7:
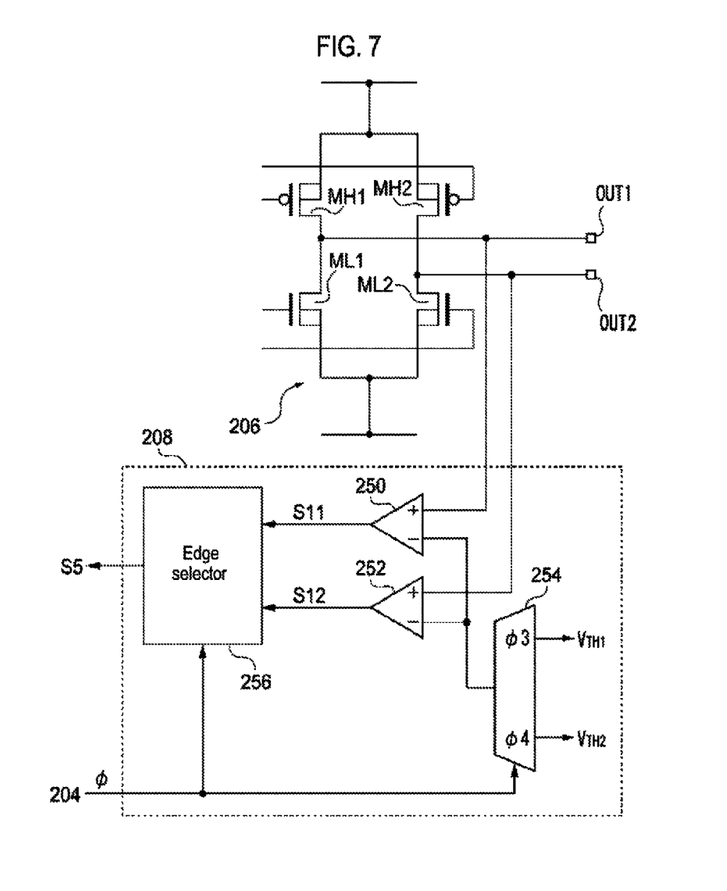
FIG. 7 is a circuit diagram illustrating an exemplary configuration of a current monitoring circuit.

FIG. 7 is a circuit diagram illustrating an exemplary configuration of the current monitoring circuit 208. The current monitoring circuit 208 may include a first comparator 250, a second comparator 252, a selector 254 and an edge selector 256. The selector 254 may be configured to select the first threshold voltage $V_{TH1}$ in the pre-regenerative state φ3 and the second threshold voltage $V_{TH2}$ in the post-regenerative state φ4. Since the logic circuit 204 knows the current state, the selector 254 (i.e., the threshold voltages) can be switched by the logic circuit 204.

The first comparator 250 may be configured to compare a voltage (counter electromotive force) of the first output OUT1 with an output of the selector 254. That is, a combination of the first comparator 250 and the selector 254 can compare the counter electromotive force of the first output OUT1 with the first threshold voltage $V_{TH1}$ in the pre-regenerative state φ3 and with the second threshold voltage $V_{TH2}$ in the post-regenerative state φ4.

Similarly, the second comparator 252 may be configured to compare a voltage (counter electromotive force) of the second output OUT2 with an output of the selector 254. That is, a combination of the second comparator 252 and the selector 254 may compare the counter electromotive force of the second output OUT2 with the first threshold voltage $V_{TH1}$ in the pre-regenerative state φ3 and with the second threshold voltage $V_{TH2}$ in the post-regenerative state φ4.

The edge selector 256 may be configured to receive an output S11 from the first comparator 250 and an output S12 from the second comparator 252, to select an edge according to the current state, and asserts the zero current detection signal S5 at a timing of the selected edge.

Figure 8A:
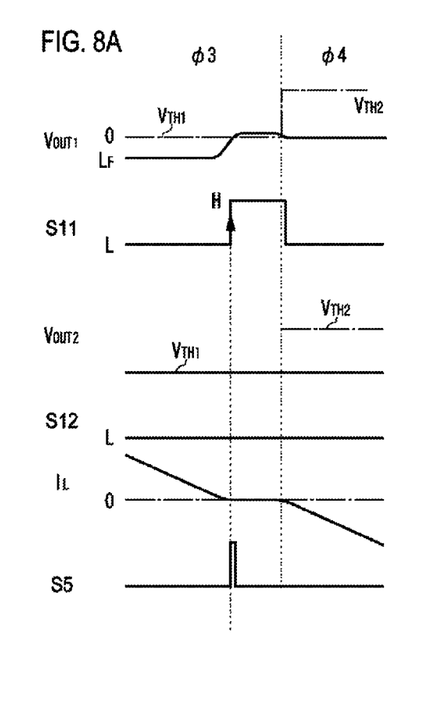
FIGS. 8A and 8B illustrate operation waveform diagrams of the current monitoring circuit.
Figure 8B:
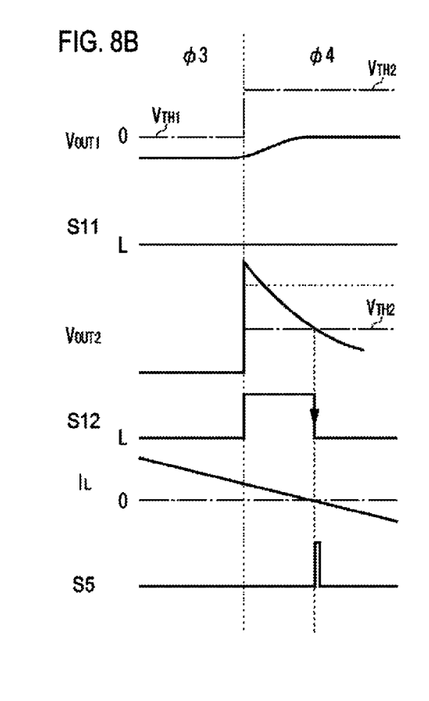

FIGS. 8A and 8B illustrate operation waveform diagrams of the current monitoring circuit 208. FIG. 8A shows a case where the current phase lead and FIG. 8B shows a case where the current phase lags. FIGS. 8A and 8B show a state where OUT1 is an OFF output and OUT2 is an ON output. When the current phase leads as shown in FIG. 8A, the zero current is generated in the pre-regenerative state φ3 and a positive edge of the output S11 of the first comparator 250 monitoring the OFF output OUT1 indicates a timing of the zero current.

As shown in FIG. 8B, when the current phase lags, the zero current is generated in the post-regenerative state φ4 and a negative edge of the output S12 of the second comparator 252, which monitors the ON output OUT2 indicates a timing of the zero current.

The referenced comparators are exchanged in a state where the ON output and the OFF output are exchanged. The edge selector 256 of FIG. 7 may select an appropriate edge in response to the current state and the allocation of the ON output and the OFF output.

The configuration of the motor driving apparatus 200 has been described above. Subsequently, the operation thereof will be described.

Figure 9:
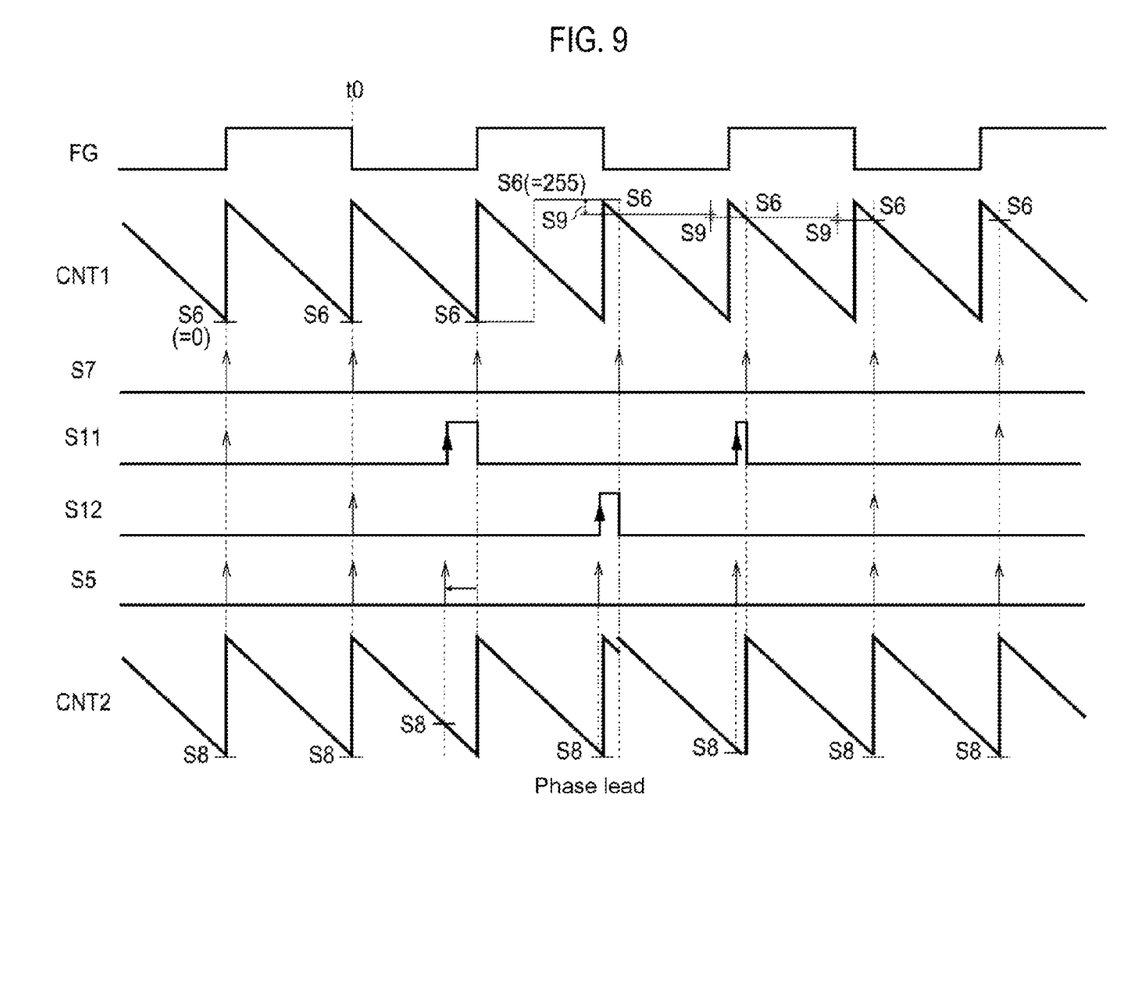
FIG. 9 is an operation waveform diagram of the motor driving apparatus when a phase lead occurs.

FIG. 9 is an operation waveform diagram of the motor driving apparatus 200 when the phase lead occurs. There is no phase lead and phase lag occurred prior to time t0. An initial value of the lead angle set value S6 is zero. At this time, timings of the zero current detection signal S5 and the transition pulse S7 are lined up. As the current phase greatly leads at time t0, the zero current detection signal S5 is asserted ahead of the transition pulse S7. In the subsequent cycle, the correction amount S9 is provided according to the amount of the phase lag that is indicated by the current phase value S8, thereby increasing the lead angle set value S6.

Accordingly, the timing of assertion of the transition pulse S7 becomes earlier and the driving sequence is forward shifted on the time axis. As a result, in the subsequent cycle, the timing of the zero current S5 is backward shifted on the time axis. By repeating this operation, the timing of the zero current S5 approaches a target position indicated by the lead angle reference value S3. When the amount of shift of the current phase is eventually zero, the correction amount S9 becomes zero and the lead angle set value S6 is kept constant.

Figure 10:
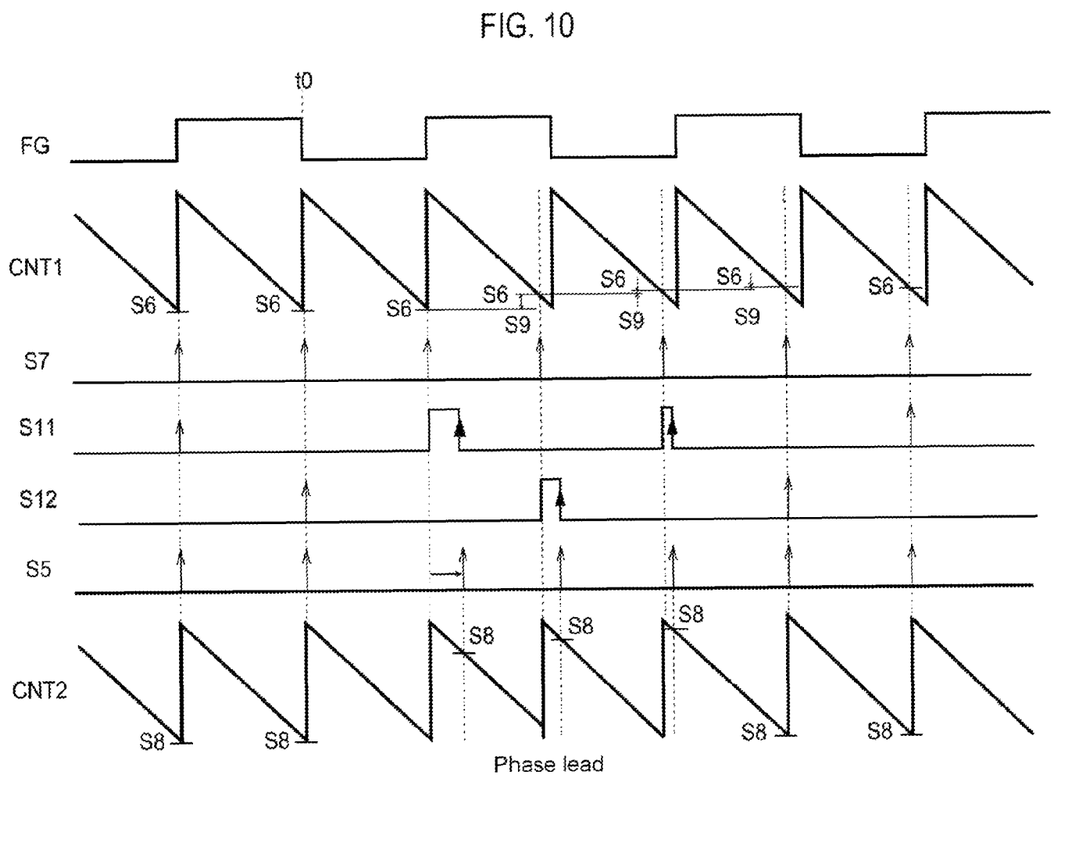
FIG. 10 is an operation waveform view of the motor driving apparatus when a phase lag occurs.

FIG. 10 is an operation waveform view of the motor driving apparatus 200 when the phase lag occurs. There is no phase lead and phase lag occurred prior to time t0. An initial value of the lead angle set value S6 is zero. At this time, timings of the zero current detection signal S5 and the transition pulse S7 are lined up. As the current phase greatly lags at time t0, the zero current detection signal S5 is asserted after the transition pulse S7. In the subsequent cycle, the negative correction amount S9 is provided according to the amount of the phase lead that is indicated by the current phase value S8, thereby decreasing the lead angle set value S6. Thus, the timing of assertion of the transition pulse S7 becomes late and the driving sequence is backward shifted on the time axis. As a result, in the subsequent cycle, the timing of the zero current S5 is forward shifted on the time axis. By repeating this operation, the timing of the zero current S5 approaches a target position indicated by the lead angle reference value S3. When the amount of shift of the current phase is eventually zero, the correction amount S9 is zeroed and the lead angle set value S6 is kept constant.

According to the motor driving apparatus 200 of the present embodiment, it is capable of monitoring a zero current timing of the coil current $I_L$ and shifting the sequence of the H bridge circuit 206 on the time axis based on the monitored timing, thereby approaching the current phase to a desired position. Therefore, it is possible to prevent a jumping voltage which may be caused by a current lag.

A current phase is known to have an effect on efficiency and torque of a motor. The motor driving apparatus 200 according to the embodiment is capable of improving the efficiency and torque since the current phase can be set in a desired position.

Figure 11:
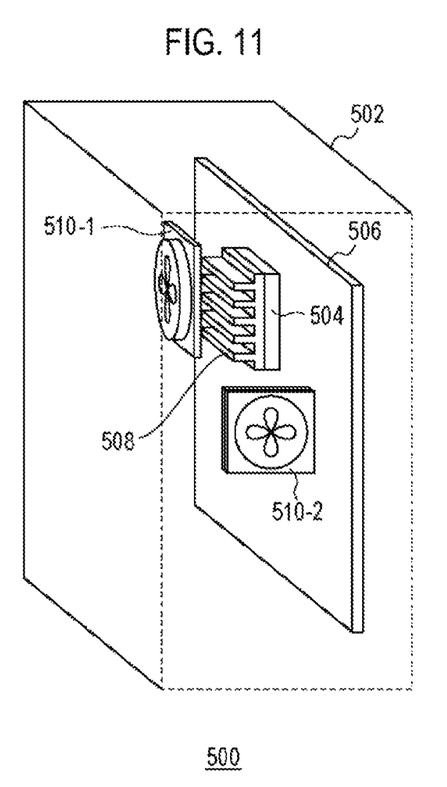
FIG. 11 is a perspective view of a computer equipped with a cooling system.

Lastly, the use of the motor driving apparatus 200 will be described. FIG. 11 is a perspective view of a computer equipped with a cooling system 510. The cooling system 510 may include a single-phase fan motor 102 and the motor driving apparatus 200 shown in FIG. 3. The computer 500 may include a housing 502, a CPU 504, a mother board 506, a heat sink 508 and a plurality of cooling systems 510.

The CPU 504 may be mounted on the mother board 506. The heat sink 508 may be in close contact with the top surface of the CPU 504. A cooling system 510-1 may be placed to face the heat sink 508 and blows air to the heat sink 508. A cooling system 510-2 may be placed in the back side of the housing 502 and feed external air into the housing 502.

The cooling system 510 may be mounted on a variety of electronic equipment such as a workstation, a notebook computer, a television, a refrigerator and the like, in addition to the computer 500.

The motor driving apparatus 200 according to the present embodiment is not limited to the driving of the fan motor but may be used for driving of different types of motors.

According to the present disclosure in some embodiments, it is possible to prevent jump of a power supply voltage and an output voltage and/or improving efficiency.

While certain embodiments have been described, these embodiments have been presented by way of example only, and are not intended to limit the scope of the disclosures. Indeed, the novel methods and apparatuses described herein may be embodied in a variety of other forms; furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures.

What is claimed is:

1. A motor driving apparatus for driving a single-phase motor, comprising:
  an H bridge circuit configured to receive a power supply voltage and a ground voltage, and having a first output and a second output which are coupled with a motor coil of the single-phase motor;
  a hall comparator configured to compare a pair of hall signals generated by a hall element and generate a hall detection signal indicating a position of a rotor of the single-phase motor;
  a speed detection circuit configured to receive the hall detection signal and generate a speed detection signal having a period depending on the rotational speed of the single-phase motor;
  an electric angle generator configured to generate a pulse signal which has a frequency of a unit fraction of an integer part of the period of the speed detection signal and indicates that the single-phase motor rotates by a predetermined electric angle;
  a current monitoring circuit configured to asserts a zero current detection signal when an reversion of direction of a coil current flowing into the motor coil is detected;

a transition trigger circuit including a first counter reset which is reset at every edge of the hall detection signal and performing a count operation using the pulse signal as a clock, and configured to assert a transition pulse when a count value of the first counter matches an lead angle set value;

a logic circuit configured to transition the H bridge circuit among a plurality of states according to a predetermined sequence, using at least the transition pulse as a trigger; and a lead angle controller configured to adjust the lead angle set value based on a timing of assertion of the zero current detection signal.

2. The motor driving apparatus of claim 1, wherein the lead angle controller includes:

a second counter configured to be reset in response to the assertion of the transition pulse and perform the count operation using the pulse signal as a clock;

a correction amount setting circuit configured to output a correction amount based on a count value of the second counter when the zero current detection signal is asserted; and an arithmetic circuit configured to output the lead angle set value based on the correction amount.

3. The motor driving apparatus of claim 2, wherein the arithmetic circuit is configured to generate the lead angle set value based on an integrated value of the correction amount.

4. The motor driving apparatus of claim 3, wherein the arithmetic circuit includes:

a memory configured to store the integrated value of the correction amount; and a first adder configured to add the correction amount to a value stored in the memory and store a result of the added correction amount in the memory.

5. The motor driving apparatus of claim 3, wherein the arithmetic circuit includes a second counter configured to generate the lead angle set value by adding a predetermined lead angle reference value to the integrated value of the correction amount.

6. The motor driving apparatus of claim 5, further comprising:

a setting terminal configured to receive an analog lead angle reference voltage; and an A/D converter configured to convert the analog lead angle reference voltage into a digital lead angle reference value.

7. The motor driving apparatus of claim 2, wherein the correction amount is set to be in a dead zone in the vicinity of zero of the amount of phase lead or lag indicated by a count value of the second counter.

8. The motor driving apparatus of claim 1, wherein the logic circuit is configured to repeat a sequence including:

a conduction state in which one of the first output and the second output is an ON output, the other is an OFF output, the ON output is fixed to the power supply voltage or switched between the power supply voltage and high impedance at a predetermined duty cycle, and the OFF output is the ground voltage;

a pre-regenerative state in which the ON output and the OFF output are exchanged, the ON output is the ground voltage, and the OFF output is the high impedance; and a post-regenerative state in which the ON output is the ground voltage or the high impedance and the OFF output is the ground voltage, wherein the current monitoring circuit is configured to assert the zero current detection signal when a voltage of the OFF output exceeds a first threshold voltage set to or near the ground voltage in the pre-regenerative state, and wherein the current monitoring circuit is configured to assert the zero current detection signal when a voltage of the ON output is lower than a second threshold voltage set between the power supply voltage and the ground voltage in the post-regenerative state.

9. The motor driving apparatus of claim 8, wherein the current monitoring circuit includes:

a selector configured to select the first threshold voltage in the pre-regenerative state and select the second threshold voltage in the post-regenerative state;

a first comparator configured to compare the voltage of the first output with an output of the selector; and a second comparator configured to compare the voltage of the second output with the output of the selector.

10. The motor driving apparatus of claim 1, wherein the logic circuit is further configured to repeat a sequence including:

a conduction state in which one of the first output and the second output is an ON output, the other is an OFF output, the ON output is fixed to the power supply voltage or switched between the power supply voltage and high impedance at a predetermined duty cycle, and the OFF output is the ground voltage;

a pre-regenerative state in which the ON output and the OFF output are exchanged, the ON output is the ground voltage, and the OFF output is the high impedance; and a post-regenerative state in which the ON output is the ground voltage or the high impedance and the OFF output is the ground voltage, and wherein the current monitoring circuit is further configured to assert the zero current detection signal when a voltage of the OFF output exceeds a first threshold voltage set to or near the ground voltage in the pre-regenerative state.

11. The motor driving apparatus of claim 10, wherein the current monitoring circuit includes:

a first comparator configured to compare the voltage of the first output with the first threshold voltage; and a second comparator configured to compare the voltage of the second output with the first threshold voltage.

12. The motor driving apparatus of claim 1, wherein the logic circuit is further configured to repeat a sequence including:

a conduction state in which one of the first output and the second output is an ON output, the other is an OFF output, the ON output is fixed to the power supply voltage or switched between the power supply voltage and high impedance at a predetermined duty cycle, and the OFF output is the ground voltage;

a pre-regenerative state in which the ON output and the OFF output are exchanged, the ON output is the ground voltage, and the OFF output is the high impedance; and a post-regenerative state in which the ON output is the ground voltage or the high impedance and the OFF output is the ground voltage, and wherein the current monitoring circuit is further configured to assert the zero current detection signal when a voltage of the ON output is lower than a second threshold voltage set between the power supply voltage and the ground voltage in the post-regenerative state.

13. The motor driving apparatus of claim 12, wherein the current monitoring circuit includes:

a first comparator configured to compare the voltage of the first output with the second threshold voltage; and a second comparator configured to compare the voltage of the second output with the second threshold voltage.

14. The motor driving apparatus of claim 8, wherein the sequence further includes:
   a soft switching down state inserted between the conduction state and the pre-regenerative state, in which the ON output is switched between the power supply voltage and the high impedance at a gradually decreasing duty cycle and the OFF output is the ground voltage; and
   a soft switching up state inserted between the post-regenerative state and the next conduction state, in which the ON output is switched between the power supply voltage and the high impedance at a gradually increasing duty cycle and the OFF output is the ground voltage.

15. The motor driving apparatus of claim 1, wherein the apparatus is integrated on a signal semiconductor substrate.

16. A cooling system comprising:
   a fan motor;
   a hall element configured to generate a pair of hall signals indicating the position of a rotor of the fan motor; and
   a fan motor configured to drive apparatus of claim 1, which is configured to drive the fan motor based on the pair of hall signals.

17. An electronic equipment comprising:
   a processor;
   a fan motor installed to face the processor;
   a hall element which generates a pair of hall signals indicating the position of a rotor of the fan motor; and
   a fan motor driving apparatus of claim 1, configured to drive the fan motor based on the pair of hall signals.

18. A method of driving a single-phase motor, comprising:
   providing an H bridge circuit configured to receive a power supply voltage and a ground voltage, with a motor coil of the single-phase motor connected between a first output and a second output;
   comparing a pair of hall signals generated by a hall element and generating a hall detection signal indicating a position of a rotor of the single-phase motor;
   generating a speed detection signal having a frequency depending on the rotational speed of the single-phase motor based on the hall detection signal;
   generating a pulse signal having an unit fraction of an integer part of the frequency of the speed detection signal and indicating rotation of the single-phase motor by a predetermined electric angle;
   asserting a zero current detection signal when an reversion of direction of a coil current flowing into the motor coil is detected;
   performing a count operation with the pulse signal as a clock by using a first counter which is reset at each edge of the hall detection signal and, and asserting a transition pulse when a count value of the first counter matches an lead angle set value;
   transitioning the H bridge circuit among a plurality of states according to a predetermined sequence, at least with the transition pulse as a trigger; and
   adjusting the lead angle set value based on a timing of assertion of the zero current detection signal.

* * * * *